Oct. 7, 1969  B. W. BRADLEY  3,470,735
ENVIRONMENT SIMULATOR FOR OIL WELL SCALE INHIBITORS
Filed Oct. 12, 1967
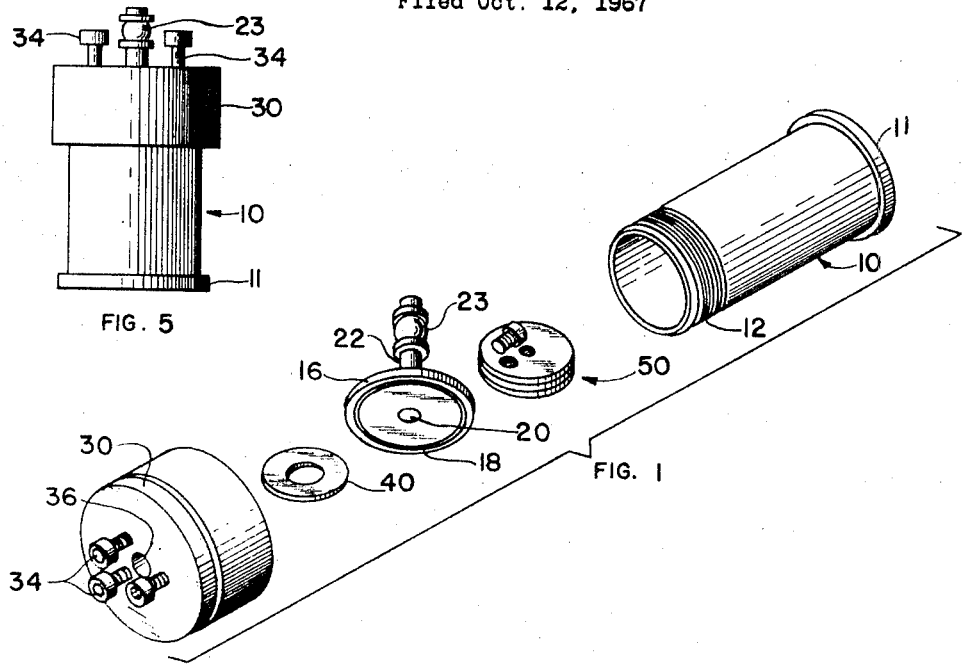
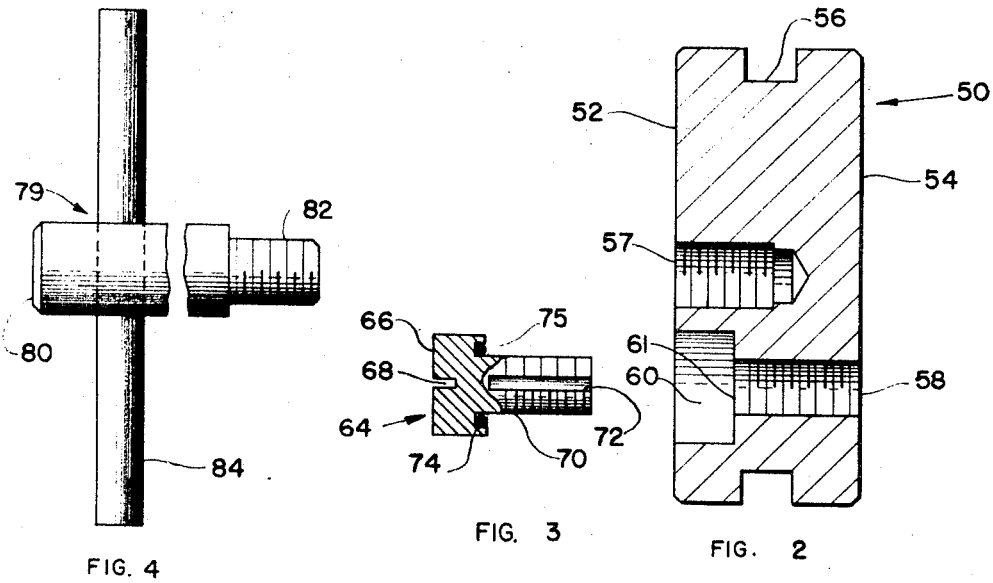
INVENTOR:
B. W. BRADLEY
BY: A. H. McCarthy
HIS AGENT _United States Patent Office_

3,470,735
Patented Oct. 7, 1969

3,470,735
ENVIRONMENT SIMULATOR FOR OIL WELL
SCALE INHIBITORS
Bryant W. Bradley, Houston, Tex., assignor, by mesne assignments, to National Lead Company, a corporation of New Jersey
Filed Oct. 12, 1967, Ser. No. 674,908
Int. Cl. G01n *11/00*
U.S. Cl. 73—61.2                                  8 Claims

ABSTRACT OF THE DISCLOSURE

In a method for testing carbonate scale inhibitors for water to be injected into subsurface earth formations comprising the steps of mixing known amounts of a scale inhibitor with known amounts of sample water to form a mixture, enclosing the mixture in a herometic enclosure, purging all gas and vapor from the enclosure, subjecting the mixture to temperatures and pressures simulating well environment conditions, and analyzing the mixture for calcium remaining in solution.

Background of the invention

This invention relates to a method and apparatus for testing the scale inhibiting capabilities of additives in water that is injected into subsurface earth formations, for example, in secondary recovery operations, water disposals, or the like. More particularly, it relates to a method and apparatus for simulating the inhibition reaction in the down-hole conditions into which the water is injected.

Ideally oil is recovered from wells into which it is displaced by energy originally available in the reservoir. But if the recovery by these natural forces, frequently called the primary recovery, is relatively low, it may be economical to increase the yield of the well by so-called secondary recovery techniques.

One of the most useful of secondary recovery techniques is water flooding. In this technique, water is injected under pressure into an oil-containing reservoir through injection wells so that the oil is displaced towards nearby producing wells. To inject water into the reservoir, it is pumped from a nearby source overland through surface pipes to an injection well where it is forced under high pressure to the oil-bearing interval encountered by the well and into the reservoir. The water and oil normally migrate through interstices of the reservoir rock that comprise tiny capillaries. If the capillaries become plugged, the effective migration of both water and oil is eliminated.

The water available for water flooding frequently contains dissolved minerals, particularly calcium bicarbonate. In the past it has been found that this salt, in solution at surface temperature and pressures, will precipitate out of solution, in the form of calcium carbonate, as the water is heated by the geothermal gradient in passing down the well. Calcium carbonate forms scale on the inside of the tubing or casing and seals off the pores of the rock on the face of the borehole. When this happens the injection rate is gradually reduced until it is necessary to remove the scale by acid washes. Both result in increased operating costs.

To overcome this problem, water additives have been developed to keep the mineral deposits in solution until the water has passed a few feet into a reservoir formation. It is important to keep the minerals in solution until the volume of capillaries available for water migration is large relative to the amount of minerals that can precipitate.

Naturally, the well bores and flood waters differ markedly from area to area. Relatively larger or smaller concentrations of minerals may be present in the waters, the pH (or acidity) may vary, etc. When this is added to the fact that there are now available many additives of varying effectiveness, it is clear that a need exists for testing a particular additive with a particular flood water to make sure that the mineral deposits do indeed remain in solution during the critical time when the water passes through the well-reservoir interface. Attempts at providing a means for so testing have been made. Equipment of the type manufactured by Baroid Division of National Lead Company, Houston, Tex., Unit Model 639–90 or 639–91 are examples. Typically, two synthetic, incompatible waters and the additive to be tested are mixed and sealed in separate containers. The container is heated and allowed to stay at a certain temperature typical of downhole conditions. The brines, one $CaCl_2$ and one $NaHCO_3$, are then commingled and flowed by gas pressure on the water in each reservoir through a tubular test specimen used to accumulate and measure scale deposition. This involves an unsatisfactory condition since the final mixed brine is abnormally supersaturated with calcium carbonate, and does not simulate actual downhole conditions, particularly pressure. Furthermore, on heating a bicarbonate containing brine the bicarbonate will decompose to carbon dioxide and water. With gas in contact with the so heated brine the carbon dioxide will diffuse into the gas thus changing the composition of the water.

In actual conditions in a subsurface formation no gas is in contact with the water and the pressure is high enough to keep any carbon dioxide formed in solution.

Summary of the invention

It is therefore an object of this invention to provide a method for testing scale inhibitors that more nearly simulates downhole conditions.

It is an object of this invention to provide an apparatus with which to carry out tests on scale inhibitors.

It is an object of this invention to provide a more accurate means of simulating the conditions experienced by floodwater during secondary recovery operations.

And finally, it is an object of this invention to provide an apparatus capable of applying high temperatures and pressures to a liquid and at the same time isolating the liquid from any vapor or gaseous phase.

In general, the objects of the invention can be achieved by mixing a known amount of an aqueous liquid solution of calcium bicarbonate water, typical of a given oil field brine, with a given amount of a scale inhibitor. The liquid mixture is then enclosed in a hermetic enclosure and all gas or vapor are purged therefrom. The mixture is then subjected to a temperature and pressure equivalent to the downhole conditions of an oil well. The mixture is analyzed before and after heating to determine the amounts of calcium in solution. This indicates the efficiency of the inhibitors, in the concentration treated, since the amount of the calcium will be unchanged if the inhibition is complete. Other scale-forming salts, e.g., calcium and/or magnesium sulfates, can be used in addition to, or in place of, the calcium bicarbonate.

This method may be practiced by an apparatus consisting of a cylindrical container sealed at one end and threaded at the other end, with a free piston disposed to slide in the container in such a way as to maintain a first enclosure bounded by the container and one plane surface of the piston hermetically isolated from a second enclosure bounded by the container and the other plane surface of the piston. The piston has a bleeder screw extending through it. A disk-shaped inner-top provided with a valve is disposed to make a sealing engagement with the open end of the container. A threaded outer-top with a hole in it to allow the valve to extend through it completes the apparatus.

Brief description of the drawings

FIGURE 1 is a perspective isometric view illustrating the disassembled apparatus;
FIGURE 2 is a view of the floating-piston assembly;
FIGURE 3 is a cut-away view of the vent valve;
FIGURE 4 is a view of a removal tool; and
FIGURE 5 is a front elevation of the assembled apparatus.

Description of the preferred embodiment

Referring now to FIGURE 1, a container 10 may be made of any non-corrosive, hermetic or fluidtight material. The cross sectional shape is not critical; however, the preferred embodiment illustrated in FIGURE 1 has a circular cross section. The container is closed or sealed at one end 11 which serves as the bottom and is provided with outer surface threads 12 at the other end. An inner top plate 16 (shown looking at it from the bottom) makes a sealing engagement with the open end of the container when securely fastened, as will be hereinafter described. To aid in sealing the inner top with the container, the inner top is provided with a circumferential groove into which a standard O-ring 18 is positioned. An opening or port 20 is provided in the inner top to form a conduit for the passage of gaseous- and liquid-phase matter. A conduit extension 22 is hermetically attached to the inner top so as to provide an air-tight passage from the inner surface of the top outwardly some distance therefrom. A valve 23 is positioned within the conduit. It should be able to withstand pressures of the order of 1,000 p.s.i. and is positioned such that a gas may flow from the outside of the container to the inside, but not in the reverse direction when the valve is sealed and thus closed. Outer top or cap 30 is provided with threads (not shown) on its inner surface to mate with the threads 12 on the container. The outer top is also provided with a plurality of threaded openings extending therethrough with which threaded cap screws 34 may be engaged, and with a hole 36 through which the valve conduit extension 22 may pass. A washer 40 is designed to fit on the upper surface of the inner top surrounding the conduit extension. In use, it serves as a bearing surface for cap screws 34. Floating piston 50 is disposed to slide within container 10 and will be more completely described with reference to FIGURE 2.

In FIGURE 2, floating piston 50 is shown in cross section. It is defined by two parallel plane faces 52 and 54 and is circular as best shown in FIGURE 1. It is provided with a circumferential groove 56 into which an O-ring is positioned. A threaded hole 58 with a counter sink 60 extends from face 52 through face 54 to form a continuous passage through the piston. In FIGURE 3, bleeder screw 64 consists of a head 66 with a screwdriver slot 68 therein and a threaded body 70. Parallel to the axis of the screw body and extending substantially its entire length are two bleeder slots (one shown as 72) providing a convenient passage for gas or liquid to by-pass the threads when the bleeder screw is open. The bottom side of head 66 is provided with a circumferential groove 74 into which an O-ring 75 is positioned.

The bleeder screw threads mate with threaded hole 58, and screw head 66 is received by the counter sink. In operation, the bleeder screw allows gases or liquids to pass between faces 52 and 54 of the piston so long as the bleeder screw O-ring, and the bottom face 61 of counter sink 60 are not sealingly engaged.

FIGURE 4 shows a removal tool 79 consisting of a cylindrical body 80 with threads 82 at one end and a handle 84 at the other end. In operation, the tool 79 is used to remove piston 50 from container 10 by screwing threads 82 of the tool 79 into a threaded hole 57 in the piston 50 and pulling the piston upwardly out of the container. Mechanical aids can be readily designed to gain leverage for ease in installing and removing piston 50 from container bomb 10.

Operation of the invention

In accordance with the present invention, a scale inhibitor to be tested is mixed with a sample of the water that is to be used as water in a flood or to be injected into a disposal well. The next step is to simulate injection hole temperature and pressure conditions. This is done by enclosing the mixture in an hermetic enclosure, purging the enclosure of substantially all gas or vapor, and subjecting the mixture to pressure and temperature equivalent to injection well conditions.

Container 10 is partially filled with a mixture and piston 50 is positioned in the cylinder contiguous to the mixture. With bleeder screw 64 in an open position, pressure is exerted on tool 79 connected to piston 50 so that the piston is displaced into the liquid with the displaced liquid flowing out through bleeder slot 72. In this way, all gas and vapor are purged from the enclosure. The bleeder screw is then tightened down until O-ring 75 sealingly engages face 61 of the counter sink. The excess water is decanted, and tool 79 is removed.

Next, the inner top 16 is positioned over the open end of the container; the washer 40 is positioned on the top surface of the inner top 16; and the outer top or cap 30 is screwed down onto the container 10. Cap screws 34 are turned down to insure a hermetic seal between the inner top 16 and the container 10. At this stage, container 10 consists of two enclosures or chambers: a first enclosure defined by one face 54 of the piston 50 and the container 10; and a second enclosure defined by the opposite face 52 of the piston 50, the container 10, and the inner top 16.

The container is now assembled as shown in FIGURE 5 and is ready to be pressurized. Nitrogen or any other suitable gas is introduced through conduit extension 22 into the second enclosure, and valve 23 is closed. A pressure of 800–1000 p.s.i. is recommended.

At this point, the container is heated to 190° F. The heating operation may be achieved in any one of a number of ways; however, a thermostatically-controlled oil bath has been found satisfactory.

After the testing period, the container is removed from its 190° environment, cooled, depressurized, and opened. After removal from the container 10, the water is filtered and analyzed for minerals remaining in solution. A calcium analysis, the mineral most frequently tested, may be done by a standard titration technique for calcium. Since these tests are well known in the art, they will not be further described here.

The time for which the mixture is allowed to remain at the elevated temperature and pressure is dependent upon the physical setup of the injection well and will generally vary from well to well. However, the time can be measured for any particular well and is preferably taken as the time it takes a particular volume of water to flow from a pump at the above ground water reservoir to the production interval of the injection well and pass two or three feet into the reservoir formation. To be successful, a scale inhibitor should be completely effective during this time period. Thus, at the end of the test time, there should be a sufficient concentration of effective chemical present to inhibit precipitation in spite of chemical degradation to a noninhibiting form during test.

A sample of wells drilled to varying depths and in different geological surroundings has indicated that a temperature of 190° F. will be a worst case test.

Although the invention has been described particularly with respect to water-flooding operations, it is clear that its intent and scope extend equally to other operations wherein mineral-containing water must be supplied under high temperature and pressure.

I claim as my invention:
1. In a method of testing well scale inhibitors in an environment simulating well conditions, the steps of mixing known amounts of a scale inhibitor with known amounts of sample water to form a scale inhibitor-sample water mixture, enclosing said mixture in a fluidtight enclosure, purging said enclosure of substantially all gas and vapor, and subjecting said mixture to a pressure and temperature equivalent to injection well conditions.

2. The method of claim 1 wherein said mixture is maintained at said temperature and pressure for 16–20 hours.

3. The method of claim 1 wherein said pressure is in excess of 800 p.s.i. and said temperature is in excess of 190° F.

4. The method of claim 1 followed by analyzing said mixture to determine the concentration of minerals in solution.

5. In a method of testing well scale inhibitors the steps of:

mixing known quantities of a scale inhibitor with a known amount of sample water to form a scale inhibitor-sample water mixture, enclosing said mixture in a hermetic enclosure, purging said enclosure of substantially all gas and vapor, subjecting said mixture to a pressure in excess of 800 p.s.i. and a temperature in excess of 190° F. for a time of between 16–20 hours, cooling and depressurizing said mixture, and analyzing said mixture for calcium remaining in solution.

6. An apparatus for testing scale inhibitors for fluids to be injected into an oil well comprising:

an open end container means;

piston means, said means disposed to slide within said container means;

first valve means, said first valve means extending through said piston means to control the passage of fluid therethrough;

a top disposed to seal said container means, said top including a second valve means disposed to pass gasses through said top.

7. An apparatus for testing scale inhibitors for liquids to be injected into oil wells, including in combination:

a cylindrical container, said container sealed at one end and threaded at the other end;

a disc-shaped floating piston, said piston disposed to slide within said container in such a manner as to maintain a first enclosure bounded by the sealed end of said container and said piston hermetically isolated from a second enclosure bounded by the threaded end of said container and said piston, said piston further being provided with a threaded opening extending therethrough;

a bleeder screw, said bleeder screw being disposed in said opening;

a disc-shaped inner top disposed to make sealing engagement with the threaded end of said container, said inner top being provided with a gas conduit within which a one-way valve is disposed to allow gas to pass into said container;

an outer top, said top including threads thereon to mate the threads on said container, an opening disposed to allow access to said gas conduit, and a plurality of threaded openings into which cap screws are disposed;

a washer, said washer disposed between said inner top and said outer top to receive pressure from said cap screws.

8. A method of testing an inhibited scale-forming water for injection into a subsurface earth formation including the steps of determining the pressure and temperature in said earth formation;

mixing known amounts of a scale inhibitor with known amounts of a scale-forming water of known composition to form a scale inhibitor-water mixture;

enclosing said mixture in a fluidtight enclosure;

purging said enclosure of substantially all gas and vapor;

subjecting said mixture to a temperature and pressure equivalent to the temperature and pressure in said earth formation; and determining the extent to which scale-formation occurred during said heating.

References Cited

UNITED STATES PATENTS

| 3,080,747 | 3/1963 | Kerst | 73—61.2 |
| 3,141,324 | 7/1964 | Boies et al. | 73—61.2 |

LOUIS R. PRINCE, Primary Examiner

JOSEPH W. ROSKOS, Assistant Examiner

U.S. Cl. X.R.

73—432